(12) United States Patent
Kuo et al.

(10) Patent No.: US 6,252,020 B1
(45) Date of Patent: Jun. 26, 2001

(54) METHOD FOR FORMING NANOCOMPOSITES

(75) Inventors: Wen-Faa Kuo; Mao-Song Lee, both of Hsinchu; Chien-Shiun Liao, Taichung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/286,550

(22) Filed: Apr. 5, 1999

(30) Foreign Application Priority Data

Oct. 29, 1998 (TW) ................................................. 87118007

(51) Int. Cl.⁷ ................................ C08F 12/08; C08F 4/04

(52) U.S. Cl. .......................... 526/128; 526/548; 526/126; 501/141; 501/145; 501/148; 428/327; 428/407; 428/500; 428/403; 428/405

(58) Field of Search ..................................... 526/128, 126, 526/348; 501/141, 145, 148; 428/403, 405, 407, 327, 500; 106/416, 417

(56) References Cited

U.S. PATENT DOCUMENTS

| 3,696,172 | * | 10/1972 | Kaiho et al. | ..................... 260/880 R |
| 4,618,528 | * | 10/1986 | Sacks et al. | ......................... 428/216 |
| 5,073,447 | * | 12/1991 | Mizuno et al. | ..................... 428/327 |

FOREIGN PATENT DOCUMENTS

WO 97/00910 * 1/1997 (WO).

* cited by examiner

*Primary Examiner*—David W. Wu
*Assistant Examiner*—Ling-Siu Choi
(74) *Attorney, Agent, or Firm*—Darby & Darby

(57) ABSTRACT

Disclosed is a method for forming a polymer nanocomposite, which comprises (a) modifying a clay material comprising layered silicate particles by ion exchange with a surfactant to form an organoclay; (b) dispersing the organoclay in a vinyl monomer and bulk polymerizing said monomer in the presence of a catalyst; and (c) adding a liquid suspension to the above mixture to effect suspension polymerization when the conversion rate of the polymerization is about 10% to 50%, thereby forming a composite having the particles uniformly dispersed in a vinyl polymer matrix.

24 Claims, 1 Drawing Sheet

METHOD FOR FORMING NANOCOMPOSITES

BACKGROUND OF THE INVENTION

1. Field of the Invention

The present invention relates in general to a method for preparing polymer composites. More particularly, it relates to a method for preparing a nanocomposite comprising a vinyl polymer matrix having dispersed therein layered silicate particles.

2. Description of the Related Arts

Nanocomposites are a new class of materials which exhibit ultrafine phase dimensions, typically in the range 1–100 nm. Experimental work on these materials has generally shown that virtually all types and classes of nanocomposites lead to new and improved properties when compared to their micro- and macrocomposite counterparts.

A specific category of polymer nanocomposites has been described as a composite material comprising a polymer matrix containing a polyamide having uniformly dispersed therein layers of silicate. This polyamide composite was reported to exhibit enhanced stiffness, strength, and heat resistance. The improvements in properties observed with these nanocomposites are significant when compared (on an equal weight basis of particulate filler) to those conventionally prepared composites.

In J. Mater. Sci.,31(13), 3589–3596, 1996, a method is disclosed for making polystyrene nanocomposites wherein montmorillonite which has been surface modified with vinylbenzyltrimethylammonium is mixed with styrene monomer and a suitable organic solvent and then polymerization is effected in the presence of the organic solvent. The interlayer spacing of the montmorillonite contained in the resulting composite is expanded to 1.72–2.45 nm (from 0.96 nm).

Similarly, in Japanese Laid Open Patent Application No. 63-215,775, a layered clay material is surface modified by a vinyl-containing ammonium salt by an ion exchange mechanism and then mixed with an organic solvent and a vinyl monomer, followed by polymerization. As further background for the preparation of vinyl polymer nanocomposite, attention is directed to Japanese Laid Open Patent Application No. 08-151,449.

SUMMARY OF THE INVENTION

It is an object of the invention to provide a method for preparing a vinyl polymer nanocomposite in which layered silicate particles are uniformly dispersed within the polymeric matrix.

The present method for nanocomposite preparation involves dispersion of a layered clay material which has been surface modified with a surfactant and optionally a silane coupling agent in a vinyl monomer, followed by bulk polymerization and suspension polymerization.

The method according to the invention includes the sequential steps of: (a) modifying a clay material comprising layered silicate particles by ion exchange with a surfactant to form an organically modified clay; (b) optionally, functionalizing the organically modified clay by treatment with an organofunctional silane; (c) dispersing the silane-treated clay in a vinyl monomer and bulk polymerizing the monomer in the presence of a catalyst; and (d) adding a liquid suspension to the above mixture to effect suspension polymerization when the conversion rate of the polymerization is about 10% to 50%, thereby forming a composite having the particles uniformly dispersed in a vinyl polymer matrix.

In the present invention, organically modified clays, hereinafter referred to as "organoclays", are used as the mineral component of the composite. In general, organoclays represent the reaction product of a layered clay with a higher alkyl containing ammonium compound (often a quaternary). The clay materials used in the invention are layered clay minerals having exchangeable cations between the layers which can be reacted with a surfactant to form the organoclay products and can be intercalated by reactive organo silanes via an insertion mechanism. Illustrative of such layered clay materials are montmorillonite, mica, talc, and the like.

At the outset, a cation-type ammonium surfactant is used to surface modify the layered clay material. Illustrative of such surfactants are pyridinium salts and quaternary ammonium salts that have at least one alkyl group containing at least 12 carbon atoms, such as cetylpyridinium chloride, cetyltrimethyl-ammonium chloride, and the like.

In step (b), the organoclay is functionalized by organofunctional silanes which preferably have a functional group selected from one or more members of the group consisting of vinyl, epoxy, and acrylic groups. Illustrative of such silane coupling agents are vinyltriethoxysilane, 3-methacryloxypropyl-trimethoxysilane, 3-glycidyloxypropyltrimethoxysilane, and the like.

In step (c), the functionalized organoclay is dispersed in a vinyl monomer, followed by bulk polymerization. The polymerization may be effected at a temperature ranging from 50° C. to 100° C. Preferably the clay material is present in an amount of 0.05% to 30% by weight based on the weight of the vinyl monomer. In the case where the clay amount is greater than 30%, the resulting composite has inferior processability, while in the case where the clay amount is less than 0.05%, no strengthening action to the composite is observed. Illustrative examples of vinyl monomers include styrene monomers, acrylonitrile monomers, and acrylic monomers. Illustrative examples of catalysts for polymerization of vinyl monomers include organo peroxides such as benzoyl peroxide (BPO) and lauroyl peroxide (LPO), and diazo compounds such as azobisisobutyronitrile (AIBN).

In step (d), a liquid suspension is added to the reaction mixture of step (c) when the conversion rate of the bulk polymerization is about 10% to 50% so as to effect suspension polymerization. The liquid suspension is preferably an aqueous suspension of polyvinyl alcohol or inorganic salts such as magnesium carbonate.

According to a feature of the invention, an intercalated material is first prepared by surface modifying a layered silicate with an alkyl ammonium salt and optionally an organofuntional silane. The layered silicate suitable for used herein has a cation-exchange capacity ranging from 50 to 200 meq/100 g. The X-ray diffraction analysis of the intercalated silicates shows a interlayer spacing ($d_{001}$) of more than 17 Å.

According to another feature of the invention, a polymer nanocomposites having uniformly dispersed layered silicate is obtained by dispersing the intercalated silicate in a vinyl monomer and then proceeding bulk polymerization and suspension polymerization sequentially. The X-ray diffraction analysis of the intercalated silicates contained in the nanocomposite shows a interlayer spacing ($d_{001}$) of more than 31 Å.

The polymer nanocomposites of the invention may be a styrene-based composite comprising polystyrene (PS), styrene-acrylonitrile (SAN), high impact polystyrene (HIPS), or acrylonitrile-butadiene-styrene (ABS); or an acrylic-based composite comprising, for example, polymethyl methacrylate.

Other objects, features, and advantages of the present invention will become apparent from the following detailed description which makes reference to the accompanying drawings.

Without intending to limit it in any manner, the present invention will be further illustrated by the following examples. In the examples, all parts are by weight unless otherwise specified.

DESCRIPTION OF THE PREFERRED EMBODIMENTS

In the following, montmorillonite powder (Kunipia F, by Kunimine Kogyo Co., hereafter referred as "CLAY-0") which has a cation-exchange capacity of 115 meq/100 g was employed for preparation of an organclay and an olefinic functional organclay.

Preparation of Organoclay

A layered material intercalated with an alkylammonium cation was prepared by adding 100 g montmorillonite powder to a stirred aqueous solution of 24 g N-cetyl pyridinium chloride. The alkylammonium-intercalated clay (hereafter referred as "CLAY-1") was collected in a filter and dried.

Functionalization of Organoclay

An aqueous suspension containing 100 g montmorillonite powder and 24 g N-cetyl pyridinium chloride was prepared as above. To this aqueous suspension was added 9 ml of a silane coupling agent (S-710, made by Chisso Cooperation Japan "Sila-Ace" product, having the general formula $CH_2=C(CH_3)CO_2C_2H_4Si(OCH_3)_3$) and 2 ml of concentrated hydrochloride followed by thorough mixing. An organoclay having olefinic functionalities (hereafter referred as "CLAY-2") was formed, collected in a filter and dried.

X-ray Diffraction Analysis of Clays

CLAY-0, CLAY-1, and CLAY-2 were analyzed by X-ray diffraction. According to the results shown in Table 1, the interlayer spacing ($d_{001}$) of montmorillonite was increased from about 12 Å to about 17 Å. This indicates that intercalation had taken place between the layers of montmorillonite.

Thermo-Gravimetric Analysis of Clays

Thermo-gravimetric analysis was performed on CLAY-0, CLAY-1, and CLAY-2, respectively. The results are also listed in Table 1. A pronounced weight loss (18–20%) was observed during the heating period between 200° C. and 500° C. The results confirmed that the N-cetyl pyridinium cation was intercalated between the layers of montmorillonite.

TABLE 1

| Samples | CLAY-0 | CLAY-1 | CLAY-2 |
|---|---|---|---|
| Surfactant Treatment | No | Yes | Yes |
| Silane treatment | No | No | Yes |
| Interlayer spacing ($d_{001}$) | 6.59Å | 17.04Å | 12.44Å |
| Weight loss between 200° C. and 500° C. | 19.68% | 18.14% | 0.83% |
| Residual weight after 750° C. | 73.33% | 74.42% | 87.56% |

EXAMPLE 1

Figure 1:
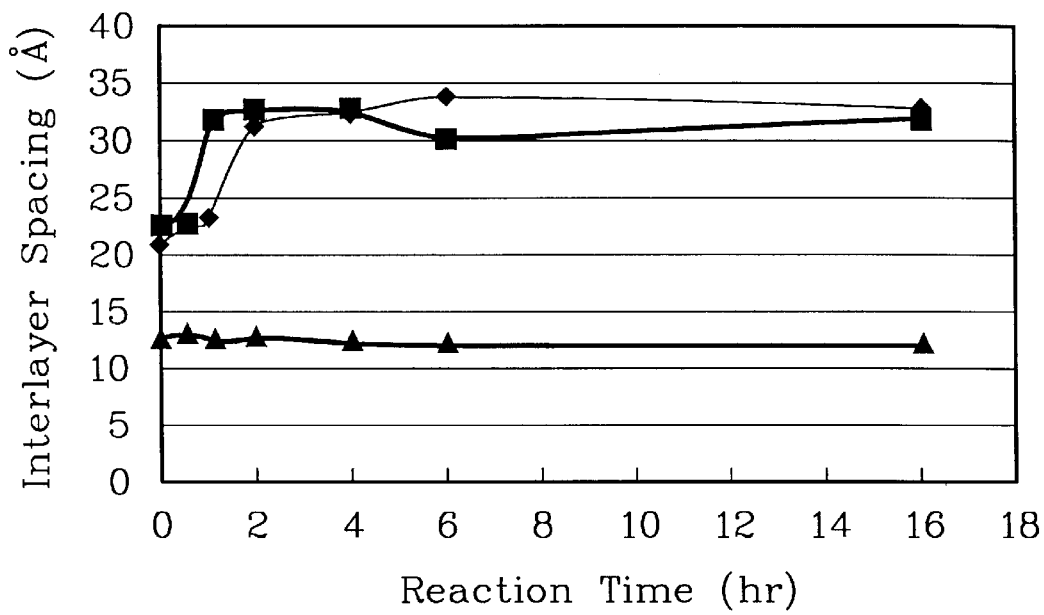
FIG. 1 is a diagram of the interlayer spacing of clays as a function of the reaction time of polymerization.

Into a reactor equipped with a nitrogen inlet, a stirring rod, a condenser and a temperature control device, 100 parts of styrene monomer, 3 parts of CLAY-2 (an olefinic functional organclay), and 0.5 parts of benzoyl peroxide were charged. The reactants were subjected to bulk polymerization at 70° C. for 6 hr. Following this, 300 parts of an aqueous suspension of polyvinyl alcohol (0.7 wt %) were added to the reactor in order to effect suspension polymerization. After the suspension polymerization was continued for 15 hr, a particulate polystyrene nanocomposite having uniformly dispersed organoclay particles was obtained by filtration. The conversion rate of the polymerization was found to be about 76%. Throughout the entire procedure the interlayer spacing of the clay was measured at regular intervals by X-ray diffraction analysis and the results are shown in FIG. 1.

The X-ray diffraction analysis indicates that the interlayer spacing ($d_{001}$) of CLAY-2 was expanded from 17 Å to 21 Å when completely swollen by the styrene monomer. Moreover, as seen in FIG. 1, the interlayer spacing (♦) increased as a function of the reaction time when the polymerization was taking place until it reached the maximum of 33 Å.

EXAMPLE 2

The same procedure as described in Example 1 was repeated except that CLAY-2 was replaced by CLAY-1. A particulate polystyrene nanocomposite was obtained accordingly. The conversion rate of the polymerization was found to be about 66%. The results of the X-ray diffraction analysis, also shown in FIG. 1, indicate that the interlayer pacing (■) of CLAY-1 also increased with the reaction time until it reached the maximum of 33 Å.

EXAMPLE 3

The same procedure as described in Example 1 was repeated except that the amount of CLAY-2 was changed to 5 parts. A particulate polystyrene nanocomposite was thus obtained in which the clay component had a interlayer spacing ($d_{001}$) of about 31 Å. The nanocomposite was injection molded into test specimens and evaluated for mechanical properties according the ASTM procedures. The injection molded test specimens exhibited a heat distortion temperature (under 264 psi) of 86° C., an impact strength of about 0.164 ft-lbs/in, a flexural strength of about 270 kgf/cm$^2$, and a flexural modulus of about 36000 kgf/cm$^2$.

Comparative Example

The same procedure as described in Example 1 was repeated except that CLAY-2 was replaced by CLAY-0. A particulate polystyrene composite having uniformly dispersed clay particles was also obtained. However, as seen in FIG. 1, since the interlayer spacing (▲) of CLAY-0 did not increase by the polymerization, no intercalation or swelling had taken place.

EXAMPLE 4

The same procedure as described in Example 1 was repeated except that 100 parts of styrene monomer was replaced by 20 parts of acrylonitrile monomer and 80 parts of styrene monomer. A particulate poly(styrene-co-acrylonitrile) nanocomposite was obtained. The conversion rate of the co-polymerization was found to be about 85%.

Figure 2:
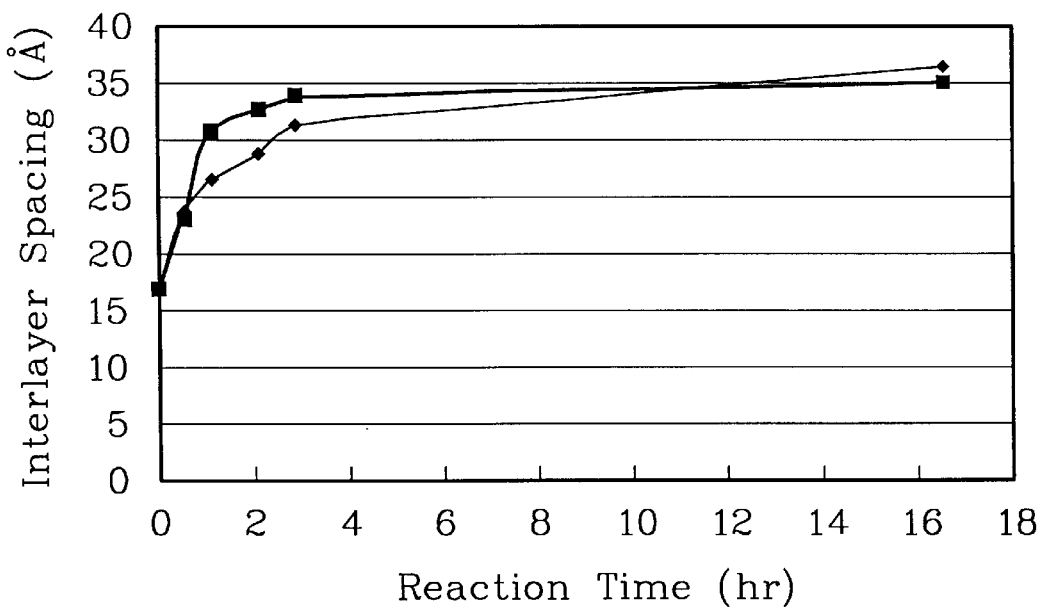
FIG. 2 is a diagram of the interlayer spacing of clays as a function of the reaction time of co-polymerization.

The results of the X-ray diffraction analysis are shown in FIG. 2. The interlayer spacing ($d_{001}$) of CLAY-2 was expanded from 17 Å to 21 Å when completely swollen by the styrene monomer and acrylonitrile monomer. As shown in FIG. 2, the interlayer spacing (♦) increased as a function of the reaction time when the co-polymerization was taking place until it reached the maximum of 36 Å.

EXAMPLE 5

The same procedure as described in Example 4 was repeated except that the amount of CLAY-2 was changed to 1.5 parts.

The results of the X-ray diffraction analysis show that the interlayer spacing ($d_{001}$) of CLAY-2 was expanded from 17 Å to 21 Å when completely swollen by the styrene monomer and acrylonitrile monomer. The interlayer spacing (■) increased as a function of the reaction time when the co-polymerization was taking place until it reached the maximum of 35 Å.

While the invention has been particularly shown and described with the reference to the preferred embodiment thereof, it will be understood by those skilled in the art that various changes in form and details may be made without departing from the spirit and scope of the invention.

What is claimed is:

1. A method for forming nanocomposities, comprising the steps of:
    (a) modifying a clay material comprising layered silicate particles by ion exchange with a surfactant to form an organically modified clay;
    (b) dispersing the organically modified clay in a liquid vinyl monomer to form a mixture and bulk polymerizing said monomer in the presence of a catalyst; and
    (c) adding a liquid suspension to the mixture to effect suspension polymerization when the conversion rate of the polymerization is about 10% to 50%, thereby forming a composite having said particles uniformly dispersed in a vinyl polymer matrix.

2. The method as claimed in claim 1, wherein said surfactant is a cation-type ammonium surfactant.

3. The method as claimed in claim 1, wherein said surfactant is a pyridinium salt or a quaternary ammonium salt containing at least one alkyl group having at least 12 carbon atoms.

4. The method as claimed in claim 3, wherein said surfactant is cetylpyridinium chloride or cetyltrimethyl-ammonium chloride.

5. The method as claimed in claim 1, wherein said clay material is selected from the group consisting of montmorillonite, mica, and talc.

6. The method as claimed in claim 1, wherein said vinyl monomer is selected from the group consisting of styrene, acrylonitrile, and acrylic monomers.

7. The method as claimed in claim 1, wherein said catalyst is an organo peroxide or a diazo compound.

8. The method as claimed in claim 1, wherein said catalyst is selected from the group consisting of benzoyl peroxide, lauroyl peroxide, and azobisisobutyronitrile.

9. The method as claimed in claim 1, wherein said clay material is present in an amount of about 0.05 to 30 percent by weight based on the weight of the monomer.

10. The method as claimed in claim 1, wherein said polymerization is carried out at 50° to 100° C.

11. The method as claimed in claim 1, wherein said suspension is an aqueous suspension of polyvinyl alcohol or inorganic salts.

12. A method for forming nanocomposites, comprising the steps of:
    (a) modifying a clay material comprising layered silicate particles by ion exchange with a surfactant to form an organically modified clay;
    (b) functionalizing the organically modified clay by treating with an organofunctional silane;
    (c) dispersing the silane-treated clay in a liquid vinyl monomer to form a mixture and bulk polymerizing said monomer in the presence of a catalyst; and
    (d) adding a liquid suspension to the mixture to effect suspension polymerization when the conversion rate of the polymerization is about 10% to 50%, thereby forming a composite having said particles uniformly dispersed in a vinyl polymer matrix.

13. The method as claimed in claim 12, wherein said surfactant is a cation-type ammonium surfactant.

14. The method as claimed in claim 13, wherein said surfactant is a pyridinium salt or a quaternary ammonium salt that contains at least one alkyl group having at least 12 carbon atoms.

15. The method as claimed in claim 14, wherein said surfactant is cetylpyridinium chloride or cetyltrimethyl-ammonium chloride.

16. The method as claimed in claim 12, wherein said clay material is selected from the group consisting of layered montmorillonite, mica, and talc.

17. The method as claimed in claim 12, wherein said organofunctional silane has a functional group selected from one or more members of the group consisting of vinyl, epoxy, and acrylic groups.

18. The method as claimed in claim 17, wherein said organofunctional silane is selected from the group consisting of vinyltriethoxysilane, 3-methacryloxypropyltrimethoxysilane, and 3-glycidyloxypropyltrimethoxysilane.

19. The method as claimed in claim 12, wherein said vinyl monomer is selected from the group consisting of styrene, acrylonitrile, and acrylic monomers.

20. The method as claimed in claim 12, wherein said catalyst is an organo peroxide or a diazo compound.

21. The method as claimed in claim 12, wherein said catalyst is selected from the group consisting of benzoyl peroxide, lauroyl peroxide, and azobisisobutyronitrile.

22. The method as claimed in claim 12, wherein said clay material is present in an amount of about 0.05 to 30 percent by weight based on the weight of the monomer.

23. The method as claimed in claim 12, wherein said polymerization is carried out at 50° to 100° C.

24. The method as claimed in claim 12, wherein said suspension is an aqueous suspension of polyvinyl alcohol or inorganic salts.

* * * * *